(No Model.)
J. B. HANNAY.
APPARATUS FOR EXTRACTING GOLD.
No. 529,263. Patented Nov. 13, 1894.
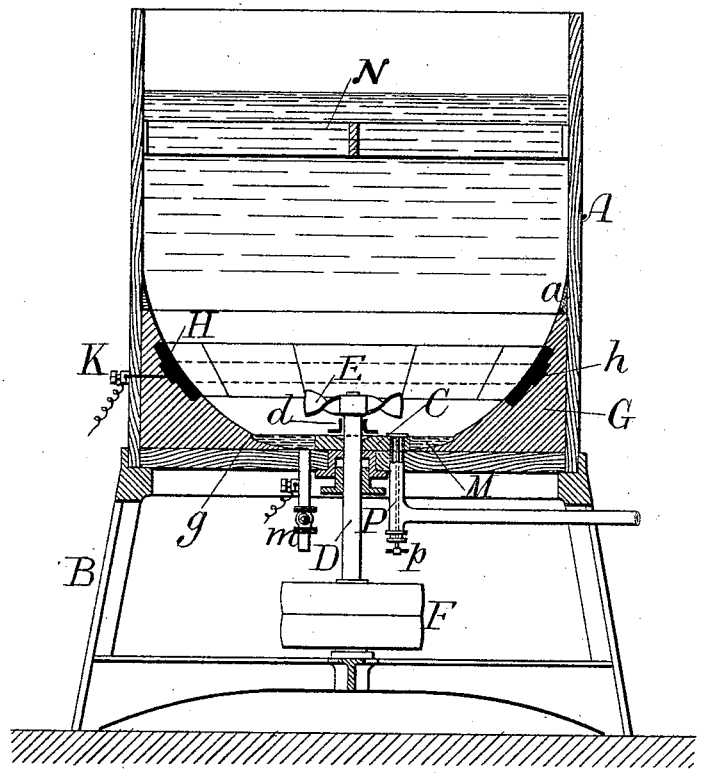

United States Patent Office.

JAMES B. HANNAY, OF LOCH LONG, SCOTLAND.

APPARATUS FOR EXTRACTING GOLD.

SPECIFICATION forming part of Letters Patent No. 529,263, dated November 13, 1894.

Application filed November 15, 1893. Serial No. 491,015. (No model.)

*To all whom it may concern:*

Be it known that I, JAMES BALLANTYNE HANNAY, a subject of the Queen of England, residing at Cove Castle, Loch Long, in the county of Dumbarton, Scotland, have invented a certain new and useful Apparatus for Extracting Gold from Minerals Containing it, of which the following is a specification.

My invention relates to apparatus for extracting gold from minerals containing it, as I shall describe with reference to the accompanying drawing which is a vertical section of the improved apparatus.

A is an open vessel, which may be of wood as shown, mounted on a stand or base B. In the bottom of the vessel at its middle is a round wooden block C through which and through a stuffing box below passes a vertical spindle D carrying at its upper end an agitating propeller E. The spindle just under the propeller is preferably surrounded by a cup leather $d$ to provide the better against leakage.

F are fast and loose pulleys to receive a belt for driving the spindle from some convenient motor.

The angles at the bottom of the vessel A are filled up to a rounded outline under a wood fillet $a$ with non conducting material G which may be cement or bituminous matter having embedded in it a zone H consisting of graphite or hard carbon slabs all electrically connected together by a metal band $h$ and to an external terminal K. The annular space surrounding the central block C and between it and a lip $g$ of the filling G, is charged with mercury M which can be drawn off by a pipe with a cock or valve $m$. Through the block C passes a pipe P the mouth of which is closed by a valve, that can be opened by pushing upward a stem extending down to a handle $p$.

To prevent continuous rotation of the contents of the vessel a stay or a pair of cross stays N are fixed some distance under the surface of the charge.

With the apparatus described the process for extraction of gold is carried on as follows: The mineral to be treated is finely pulverized and is mixed to the consistence of a fluent sludge with the solution of a cyanide, preferably potassium cyanide. This sludge is charged into the vessel A, the terminal K is connected to the plus terminal and the pipe $m$ to the minus terminal of a dynamo electric machine or other source of electricity, and the propeller E is caused to revolve agitating the contents of the vessel. The sludge is thus kept in active circulation subject to electric action in presence of the cyanide by which the small particles of gold are dissolved, and in presence of the mercury which, being kept superficially clean, takes up in amalgam the larger fragments of gold and also gold separated from the cyanide solution by electrolytic action. After sufficient treatment, the sludge can be drawn off by the pipe P, and the mercury amalgam by the pipe $m$, preferably after being enriched by dealing with successive charges of sludge.

Having thus described the nature of my invention and the best means I know for carrying the same into practical effect, I claim—

An apparatus for extracting gold comprising a vessel A provided at its bottom with an insulating lining G, a carbon zone H embedded in said lining and connected with the positive terminal of an electric generator, a mercury cup in the bottom of said vessel connected with negative terminal of said generator, a rotary agitator E, journaled in bearings in the bottom of the vessel, and the valved outlet pipes P, $m$, arranged at different levels, substantially as described.

In testimony whereof I have signed my name to this specification, in the presence of two subscribing witnesses, this 2d day of November, A. D. 1893.

JAMES B. HANNAY.

Witnesses:
OLIVER IMRAY,
*Chartered Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*